(12) United States Patent
Scruggs

(10) Patent No.: US 7,690,672 B2
(45) Date of Patent: Apr. 6, 2010

(54) ADJUSTABLE TOWING HITCH ASSEMBLY

(75) Inventor: Mark Scruggs, Walled Lake, MI (US)

(73) Assignee: Cequent Towing Products, Inc., Plymouth, MI (US)

( * ) Notice: Subject to any disclaimer, the term of this patent is extended or adjusted under 35 U.S.C. 154(b) by 0 days.

(21) Appl. No.: 11/981,188

(22) Filed: Oct. 31, 2007

(65) Prior Publication Data

US 2008/0129012 A1  Jun. 5, 2008

Related U.S. Application Data

(60) Division of application No. 11/146,403, filed on Jun. 6, 2005, now abandoned, and a continuation-in-part of application No. 10/726,149, filed on Dec. 2, 2003, now Pat. No. 7,114,741, which is a continuation-in-part of application No. 10/660,995, filed on Sep. 12, 2003, now abandoned, which is a continuation of application No. 10/459,272, filed on Jun. 11, 2003, now Pat. No. 6,746,038, which is a continuation of application No. 10/235,334, filed on Sep. 5, 2002, now Pat. No. 6,601,868, which is a continuation of application No. 09/865,277, filed on May 25, 2001, now Pat. No. 6,578,864, which is a continuation of application No. 09/431,588, filed on Nov. 1, 1999, now abandoned.

(60) Provisional application No. 60/577,397, filed on Jun. 4, 2004.

(51) Int. Cl.
 *B60D 1/52* (2006.01)
 *B60D 1/00* (2006.01)
(52) U.S. Cl. ..................... 280/491.2; 280/495
(58) Field of Classification Search .............. 280/491.1, 280/491.2, 495
 See application file for complete search history.

(56) References Cited

U.S. PATENT DOCUMENTS

| | | | |
|---|---|---|---|
| 2,031,752 A | 2/1936 | Woodruff |
| 2,148,264 A | 2/1939 | Goodell |
| 2,569,086 A | 9/1951 | Zenk |
| 3,140,071 A | 7/1964 | Lorentzen |
| 3,463,514 A | 8/1969 | Warner |
| 5,102,156 A | 4/1992 | Fink et al. |
| 5,143,393 A | 9/1992 | Meyer |
| 5,149,122 A | 9/1992 | Helber |
| 5,193,837 A | 3/1993 | Fink et al. |
| 5,489,111 A | 2/1996 | Collins |
| 5,507,515 A | 4/1996 | Schellenberg et al. |
| 5,511,813 A | 4/1996 | Kravitz |
| 5,620,198 A | 4/1997 | Borchers |
| 5,873,594 A | 2/1999 | McCoy et al. |
| 5,957,477 A | 9/1999 | Ensz et al. |
| 5,971,418 A | 10/1999 | Lindenman et al. |
| 6,139,042 A | 10/2000 | Tetrick |
| 6,173,984 B1 | 1/2001 | Kay |
| 6,199,890 B1 | 3/2001 | Lindenman et al. |

(Continued)

*Primary Examiner*—Kevin Hurley
(74) *Attorney, Agent, or Firm*—McDonald Hopkins LLC

(57) ABSTRACT

Receivers are attached to motor vehicles to tow a variety of objects such as trailers. Due to the variety of makes and models of motor vehicles, several different sized receivers are required to fit most motor vehicles. The present receiver, however, provides adjustability in at least three directions. This adjustability means that one receiver can fit many different makes and models of vehicles.

18 Claims, 8 Drawing Sheets

U.S. PATENT DOCUMENTS

| | | |
|---|---|---|
| 6,578,864 B2 | 6/2003 | McCoy et al. |
| 6,601,868 B1 | 8/2003 | McCoy et al. |
| 7,021,646 B1 | 4/2006 | Cheng et al. |
| 7,100,936 B1 | 9/2006 | Cheng et al. |
| 2006/0175369 A1* | 8/2006 | Vermette et al. ............ 224/501 |

* cited by examiner

ADJUSTABLE TOWING HITCH ASSEMBLY

CROSS-REFERENCE TO RELATED APPLICATIONS

This application is a divisional application of U.S. patent application Ser. No. 11/146,403, which was filed on Jun. 6, 2005 now abandoned. U.S. patent application Ser. No. 11/146,403 claims priority to U.S. Provisional Patent Application No. 60/577,397, which was filed on Jun. 4, 2004, and is hereby incorporated in its entirety by reference. U.S. patent application Ser. No. 11/146,403 is also a continuation-in-part of U.S. patent application Ser. No. 10/726,149, which was filed on Dec. 2, 2003, and has now issued as U.S. Pat. No. 7,114,741. U.S. patent application Ser. No. 10/726,149 is a continuation-in-part of U.S. patent application Ser. No. 10/660,995, which was filed on Sep. 12, 2003, and is now abandoned. U.S. patent application Ser. No. 10/660,995 is a continuation of U.S. patent application Ser. No. 10/459,272, which was filed on Jun. 11, 2003, and has now issued as U.S. Pat. No. 6,746,038. U.S. patent application Ser. No. 10/459,272 is a continuation of U.S. patent application Ser. No. 10/235,334, which was filed on Sep. 5, 2002, and has now issued as U.S. Pat. No. 6,601,868. U.S. patent application Ser. No. 10/235,334 is a continuation of U.S. patent application Ser. No. 09/865,277, which was filed on May 25, 2001, and has now issued as U.S. Pat. No. 6,578,864. U.S. patent application Ser. No. 09/865,277 is a continuation of U.S. patent application Ser. No. 09/431,588, which was filed on Nov. 1, 1999, and is now abandoned.

FIELD OF ART

The present invention relates generally to the towing field and, more particularly, to a multi-fit trailer hitch receiver assembly providing unmatched mounting versatility so as to allow multiple application use.

BACKGROUND

It has long been known to construct trailer hitches that are mounted to vehicles in order to allow the towing of trailers or the like. In recent years, such trailer hitches have been designed to include a central frame member or crossbar carrying mounting brackets at each end thereof for mounting the trailer hitch to the frame of the towing vehicle. The trailer hitches also include a receiver box having a rearwardly directed opening or cavity for the receipt of a hitch or draw bar that carries a hitch ball or other means allowing connection to a trailer. Examples of such a structure include the 35, 36 and 37 series Custom Receivers and Titan 45 series hitch receivers manufactured by Cequent Towing Products, Inc., the assignee of the present invention.

In recent years, vehicle manufacturers have offered not only an increasing number of vehicle options but also an increasing number of vehicle models. In order to avoid the manufacturing expense of custom designing and fitting a trailer hitch receiver to each such vehicle model or each model with each available group of equipment options, it is necessary to provide a single hitch receiver with unparalleled mounting versatility to allow mounting to multiple vehicle models and vehicle models equipped with various option packages.

One effort made in the prior art to meet this need is disclosed in U.S. Pat. No. 5,149,122 to Helber. This adjustable hitch assembly merely allows one to alter the span of the frame mounting points and/or the height of the main frame or cross member. The apparatus is, however, relatively complicated and includes a number of parts to allow adjustability while providing for the mounting of the main frame member. Further, a conventional telescoping tubular construction is used and this introduces substantial play into the arrangement resulting in a detrimental loss in rigidity.

SUMMARY OF THE INVENTION

The present invention relates to a trailer hitch receiver with heretofore unavailable mounting versatility allowing the trailer hitch receiver to be utilized on a number of different vehicle models equipped with various equipment option packages including, for example, special exhaust and suspension systems. The receiver may be equipped with one or more accessory receivers that may take the form of a bar, tube, box, or any other structure capable of receiving and holding a vehicle accessory such as, for example, a hitch bar, tow bar, article carrier, cargo container, or any other useful structure.

Specifically, the trailer hitch receiver includes selectively positionable mounting flanges and mounting brackets adapted to provide enhanced versatility when mounting the trailer hitch receiver to the frame of a towing vehicle. Further, these flanges and brackets are relatively low profile, single-piece components that are relatively inexpensive to manufacture and easy to use. Unlike conventional telescoping tubular components that have a relatively wide profile, these mounting brackets provide the necessary clearance to fit in tight areas around vehicle components and, as such, are more functional and suited to many more applications. While allowing the necessary adjustability, the flanges and brackets also insure a rigid connection.

Advantageously, the flanges may be positioned at substantially any point along the length of the cross member of the receiver. Accordingly, the spacing between the flanges may be adjusted to provide a customized fit with the frame of the vehicle to which the receiver is mounted. As a result, one receiver is capable of being mounted to more makes and models of vehicles. The brackets of the receiver may also be selectively positioned fore or aft, up or down, and inboard or outboard to provide relative adjustment in several directions. In addition, the cross member being engaged telescopingly engaged with the first and second extension tube further provide adjustability. This ability provides substantial versatility and allows the mounting of the trailer hitch assembly to a wider range of vehicles.

Additional advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, the receiver assembly comprises first and second mounting brackets removably attachable to first and second mounting flanges. The first and second mounting flanges are removably attached to first and second extension tubes respectively. A cross member is telescopically received within the extension tubes at either end thereof. The first and second mounting brackets include a set of mounting apertures. The first and second mounting flanges include a set of anchoring apertures. The first and second mounting brackets are removably attachable to the first and second mounting flanges in a variety of positions. Fasteners are attached a portion of said set of mounting apertures and a portion of said set of anchoring apertures to adjustably attach said mounting flanges and mounting brackets. This permits said receiver assembly to be positionable in different up and down (or vertical) positions and different fore and aft positions. Additionally, the first and second extension tubes with the cross member allows for additional adjustability of said receiver assembly.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

DESCRIPTION OF THE DRAWINGS

Objects and advantages together with the operation of the invention may be better understood by reference to the following detailed description taken in connection with the following illustrations, wherein.

DETAILED DESCRIPTION OF THE INVENTION

Figure 1:
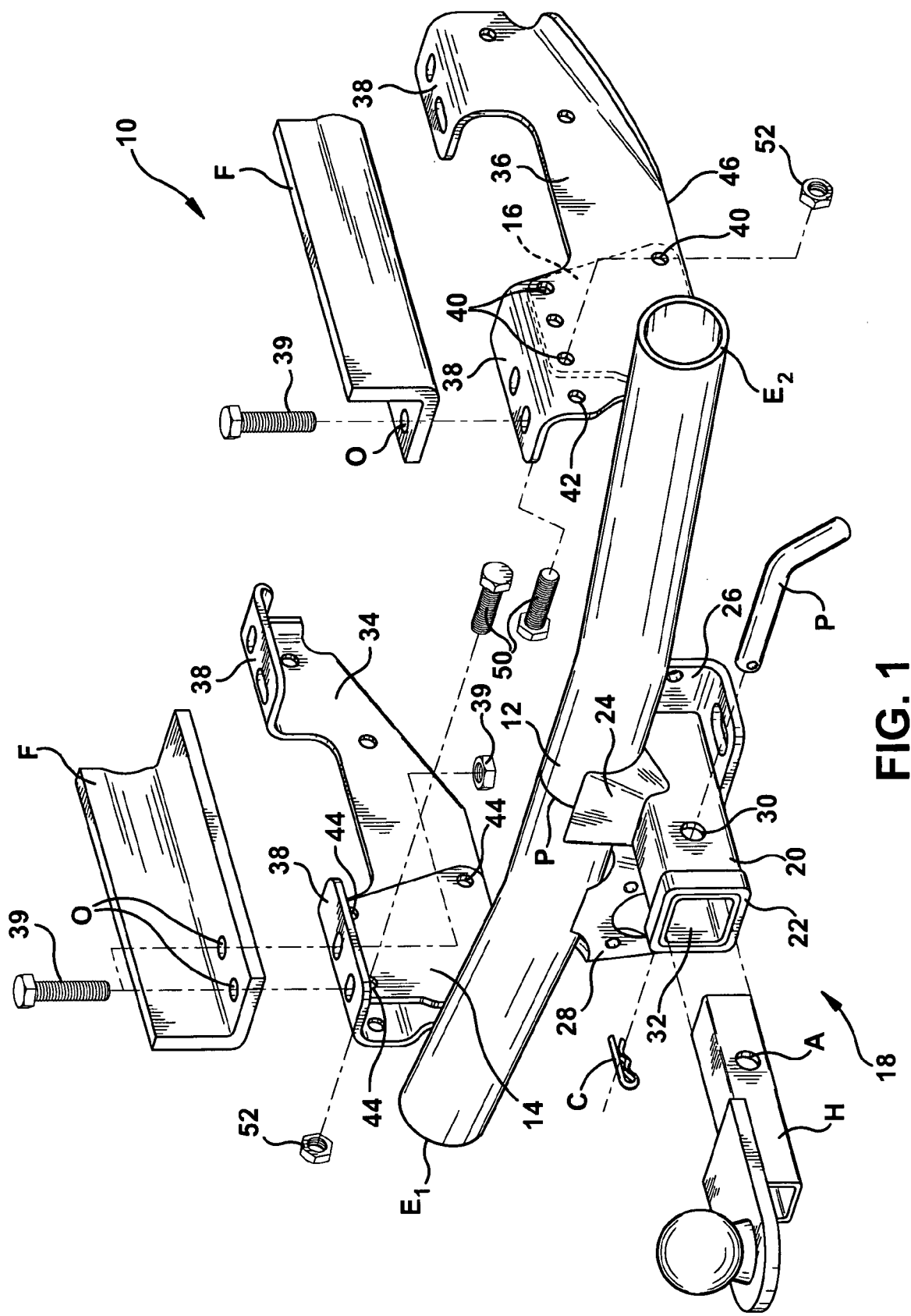
FIG. 1 is a partially exploded, perspective view of the trailer hitch receiver of the present invention with the mounting brackets mounted outboard of the mounting flanges and with the first set of mounting apertures aligned with the anchoring apertures.

Reference is now made to FIG. 1 showing the trailer hitch receiver 10 of the present invention. The trailer hitch receiver 10 includes a main frame member 11 preferably formed from tubular steel material. As clearly illustrated, the main frame member 11 includes a cross member 12 that may have a round cross section. The cross member 12 includes a first end $E_1$, and a second end $E_2$, and a midpoint P.

A first selectively positionable mounting flange 14 is secured to the cross member 12 at a selected first point between the first end $E_1$ and the midpoint P of the cross member 12. Similarly, a second mounting flange 16 is secured to the cross member 12 at a selected point between the second end point $E_2$ and the midpoint P of the cross member 12. Advantageously, by altering or adjusting the positioning of the two flanges 14, 16 along the cross member 12, the spacing between them may be varied to provide a custom fit with the frame of substantially any towing vehicle.

Each mounting flange 14, 16 may be formed from steel plate material. The flanges 14, 16 may be secured to the cross member 12 in substantially any appropriate manner including but not limited to welding or mechanical fasteners. An accessory receiver in the form of a hitch receiver box assembly 18 is carried at the middle of the main frame member 11 on the cross member 12. The hitch receiver box assembly 18 includes a receiver box 20 formed from a steel torque tube and including a reinforced lip 22. Additionally, the hitch receiver box assembly 18 includes an overlying mounting gusset 24 and a substantially L-shaped chain plate 26. The receiver box 20, gusset 24 and chain plate 26 are all welded together to the cross member 12 for strength and rigidity. Of course, other means of securing the hitch receiver box assembly 18 to the cross member 12 known in the art to be appropriate for this purpose may be utilized. In addition, a bracket 28 for supporting an electrical plug to power the trailer lighting system as well as any electrical trailer braking system may be secured to the chain plate 26 and/or the cross member 12 (as shown) in a manner well known in the art.

As should be further appreciated from FIG. 1, the receiver box 20 includes aligned cooperating apertures 30 in the sidewalls thereof (only one shown in FIG. 1). As is known in the art, a hitch or tow bar H is inserted in the rearward opening cavity 32 until a through aperture A in the hitch bar is aligned with the apertures 30 in the receiver box 20. A connecting pin P is then inserted through the aligned apertures 30 in the receiver box 20 and the aperture A in the hitch bar H. A pin clip C is then secured to the projecting end of the connecting pin P to secure the connecting pin in position and, therefore, the hitch bar H in the receiver box 20.

The receiver 10 is mounted to the towing vehicle by means of first and second mounting brackets 34, 36. Each mounting bracket 34, 36 is formed from a single piece of sheet metal that is forged or otherwise machined so as to provide at least in part two planar surfaces extending substantially perpendicular to one another; that is, a substantially L-shape in cross-section. In this way each mounting bracket 34, 36 includes at least one integral mounting skirt 38. In the embodiment illustrated, each mounting bracket 34, 36 includes a pair of spaced, integral mounting skirts 38. Each mounting skirt 38 includes a pair of openings 37 through which fasteners 39 may be utilized to secure the mounting brackets 34, 36 through cooperating openings O drilled in the frame F of the towing vehicle.

Figure 2:
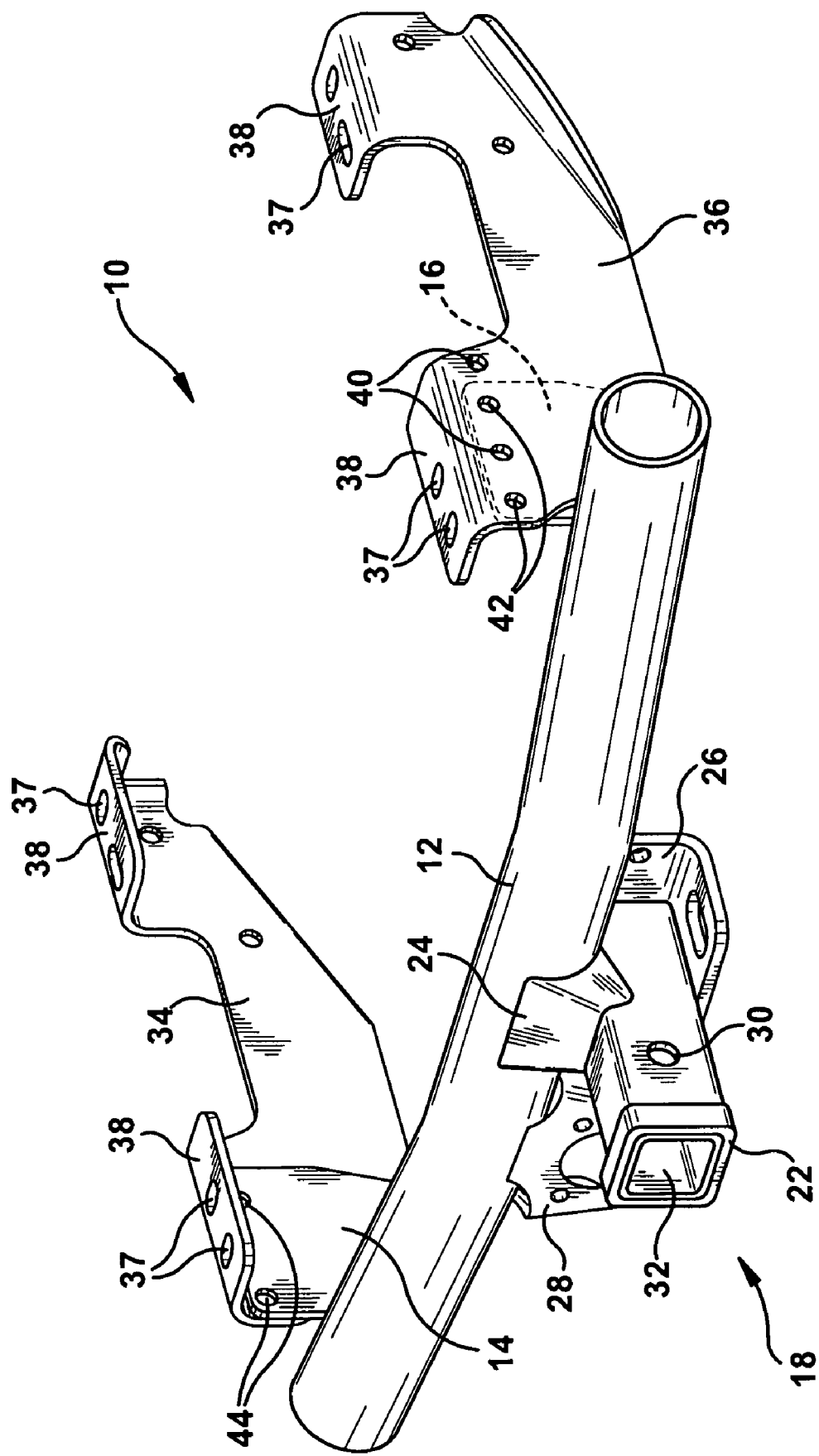
FIG. 2 is a perspective view of the trailer hitch receiver of the present invention with the mounting brackets mounted outboard of the mounting flanges and with the second set of mounting apertures aligned with the anchoring apertures.
Figure 3:
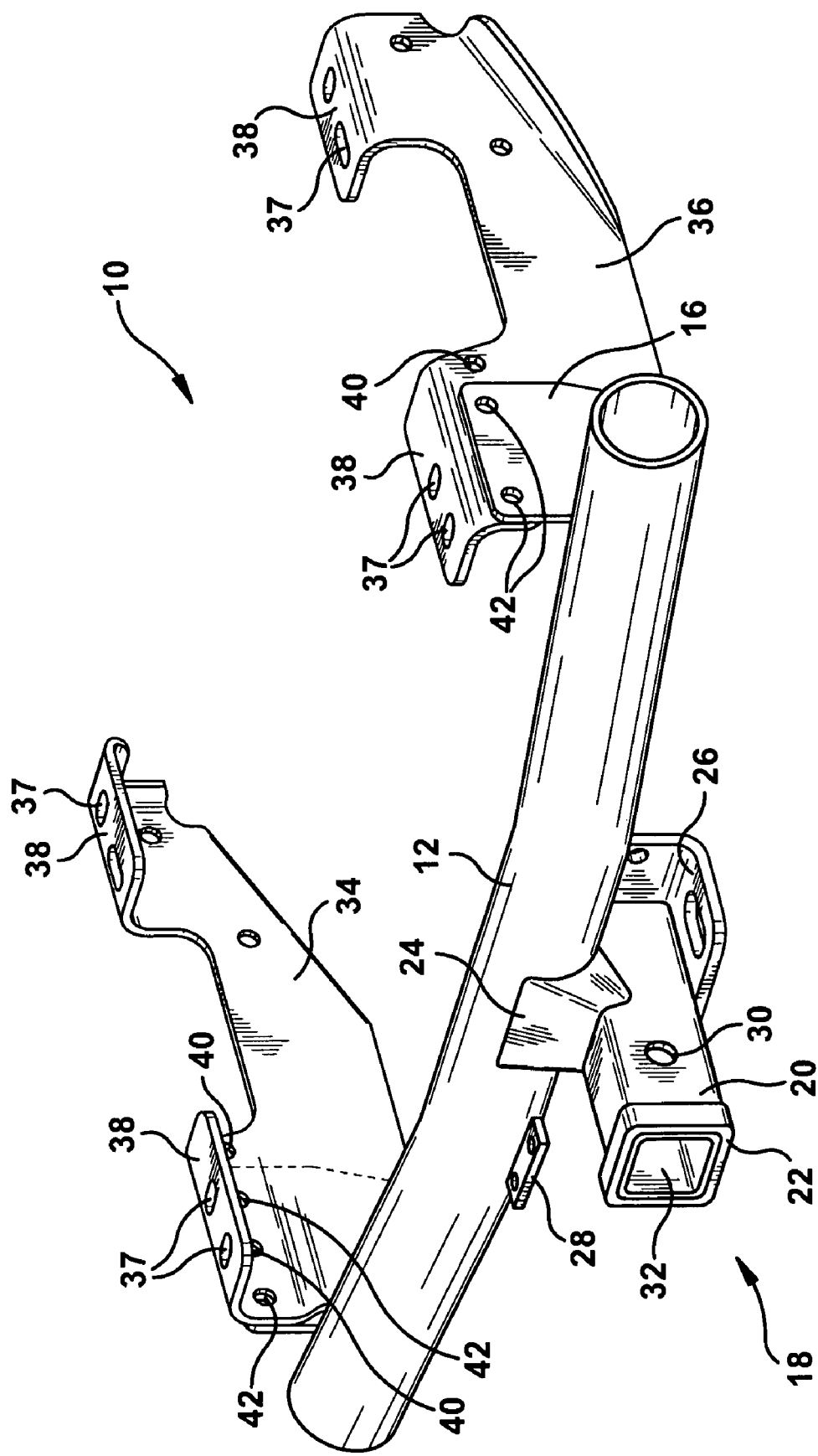
FIG. 3 is a perspective view similar to FIG. 1 but showing the mounting brackets mounted inboard of the mounting flanges, and once again with the first set of mounting apertures aligned with the anchoring apertures.

As best shown with reference to FIGS. 1-3, each of the mounting brackets 34, 36 includes a first mounting arrangement comprising a first set of four mounting apertures 40. Additionally, each mounting bracket 34, 36 includes a second mounting arrangement comprising a second set of four mounting apertures 42. It should be appreciated that one of the mounting apertures 40/42 is shared by each set. The first set of mounting apertures 40 defines a first rectangular spatial arrangement. The second set of mounting apertures 42 define a second rectangular spatial arrangement identical in shape and orientation to the first rectangular arrangement but offset therefrom a given selected distance preferably between 1.970 and 2.030 inches. Further, it should be appreciated that each arrangement defined by the first mounting apertures 40 and the second mounting apertures 42 correspond exactly in shape and orientation to the arrangement of anchoring apertures 44 provided in each of the mounting flanges 14, 16.

By aligning the first set of mounting apertures 40 of the mounting brackets 34, 36 with the anchoring apertures 44 in the first and second mounting flanges 14, 16, the mounting brackets are secured to the cross member 12 in a first selected position. Alternatively, by aligning the second set of mounting apertures 42 in the mounting brackets 34, 36 with the anchoring apertures 44 in the first and second mounting flanges 14, 16, the mounting brackets are mounted to the cross member 12 in a second alternative position. Accordingly, it should be appreciated that the present invention allows fore and aft adjustment of the relative position of the mounting brackets 34, 36 on the cross member 12.

It should be appreciated that in either of these positions, the cross member 12 is mounted in a cantilever fashion. This is because the cross member 12 is mounted to the mounting flanges 14, 16 adjacent a first or rear end thereof while all of the anchoring apertures 44 are provided adjacent a second or front end thereof; that is, all of the mounting apertures 44 are provided on the two mounting flanges 14, 16 in front of cross member 12. This structural arrangement advantageously allows for good hardware accessibility thereby simplifying vehicle installation. Further, this is accomplished while maintaining desirable hitch to body clearance. In addition, it provides good hitch box location.

Figure 4:
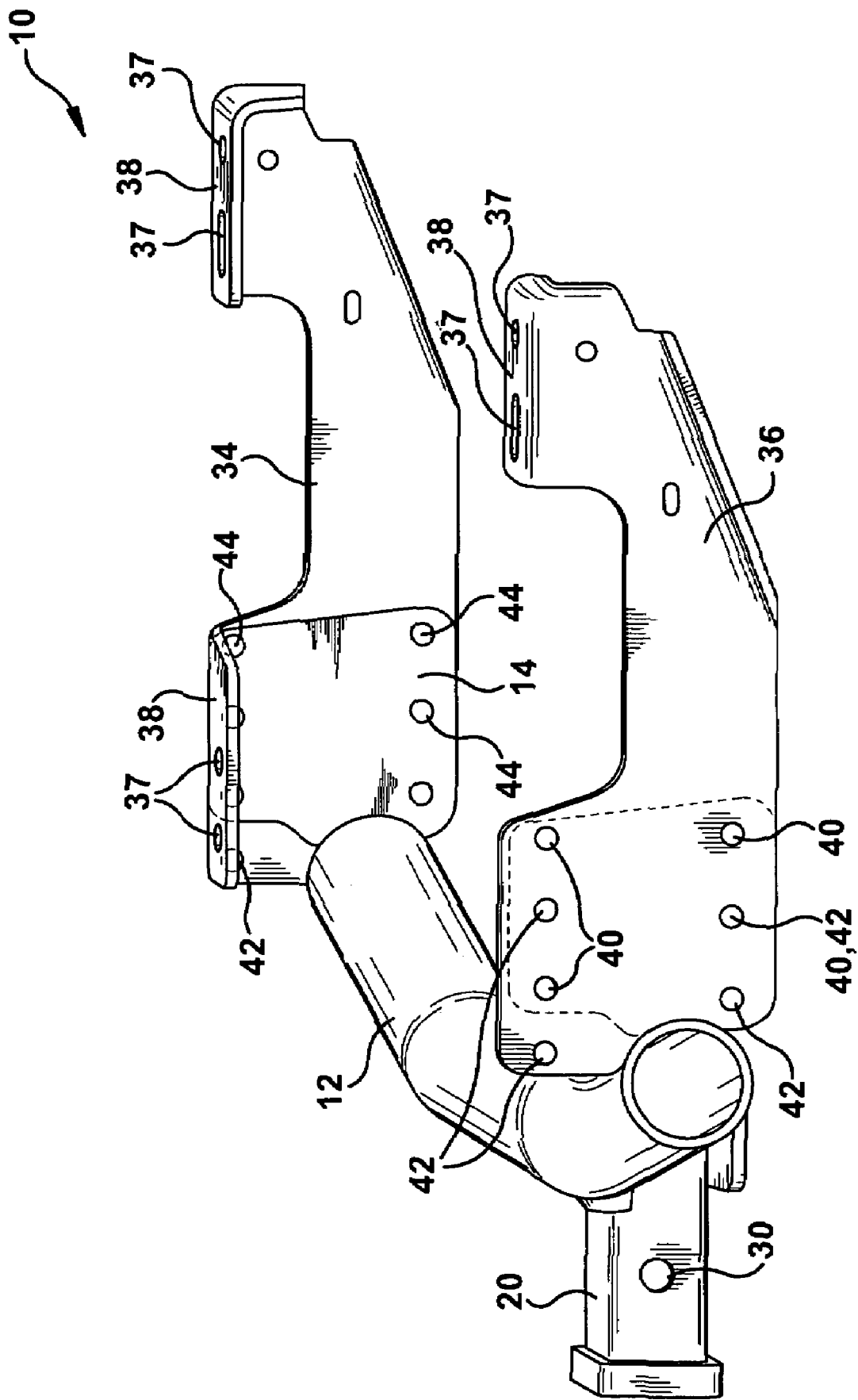
FIG. 4 is a rear side perspective view showing the clearance provided by the notch in the peripheral edge of one of the mounting brackets which allows the necessary clearance for the cross member and thus, the inboard mounting of the mounting brackets.
Figure 5:
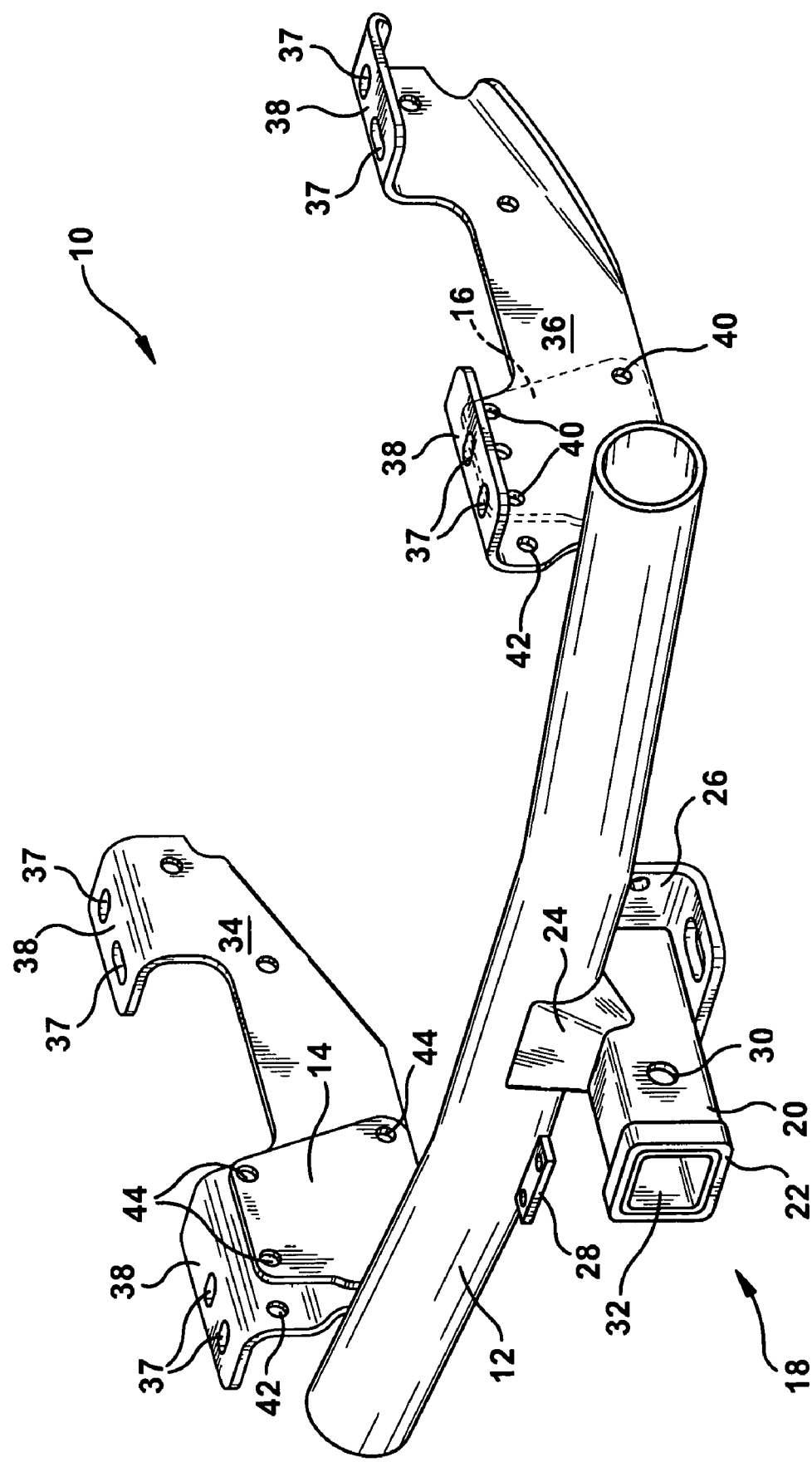
FIG. 5 is a perspective view similar to FIG. 1 with the mounting brackets reversed so that the mounting skirts point outward or away from each other.

Additionally, it should be appreciated with reference to FIGS. 1-3, the mounting brackets 34, 36 may be mounted outboard of the mounting flanges 14, 16 as shown in FIGS. 1, 2 and 5 or inboard of the mounting flanges as shown in FIGS. 3 and 4.

It should also be appreciated that the peripheral edge 46 of each mounting bracket 34, 36 defines a notch 48. The notch 48 provides the necessary clearance for the edge of the mounting brackets 34, 36 to extend around the cross member 12 while allowing the first set of mounting apertures 40 to be aligned with the anchoring apertures 44 of the mounting flanges 14, 16.

In use, the receiver installer first determines the model of the vehicle to which the trailer hitch receiver 10 is to be connected. He then reviews the equipment options and/or accessories on the vehicle particularly including any exhaust system and suspension system modifications that might affect the mounting of the trailer hitch receiver 10 to the vehicle frame.

After completing this background review, the mounting brackets, 34, 36 are secured to the mounting flanges 14, 16 that have the desired spacing along the cross member 12. More specifically, the mounting brackets 34, 36 may be oriented as shown in FIGS. 1-4 with the mounting skirts 38 projecting inwardly toward each other or they may be reversed as shown in FIG. 5 with the mounting skirts 38 projecting outwardly away from each other. This allows additional side-to-side or span adjustment for mounting on vehicle frames of varying width.

If the mounting brackets 34, 36 are to be secured inboard of the mounting flanges 14, 16, the first set of mounting apertures 40 in the mounting brackets are aligned with the anchoring apertures 44 in the mounting flanges 14, 16 (see FIGS. 3 and 4). Fasteners in the form of bolts 50 and cooperating locknuts 52 are then used to secure the mounting brackets 34, 36 in the desired position.

Whether the mounting brackets 34, 36 are to be mounted inboard or outboard of the mounting flanges 14, 16, fore and aft adjustment is also possible. In the fore or first position, the first mounting apertures 40 are aligned with the anchoring apertures 44 and the bolts 50 and the locknuts 52 are utilized to secure them in position (see FIG. 2). In the aft or second position, the second mounting apertures 42 are aligned with the anchoring apertures 44 and the bolts 50 and cooperating locknuts 52 are utilized to secure them in position (see FIGS. 1 and 5). The inboard or outboard and fore or aft positioning of the mounting brackets 34, 36 with respect to the cross member 12 is dictated by the make, model and option or accessory packages of the towing vehicle. Whichever arrangement allows the most convenient and effective mounting of the receiver 10 to the frame of the towing vehicle is the one that is utilized.

After the selection is made, the receiver 10 is lined up on the frame F and a drill is utilized to drill mounting openings 0 in the frame of the towing vehicle which are aligned with the mounting openings 37 in the mounting skirts 38. Fasteners 39, such as cooperating bolts and locknuts, are then utilized to complete the connection between the receiver 10 and the vehicle frame F. Specifically, the bolts are inserted through the openings 37 in the mounting skirts 38 and the cooperating openings cut in the vehicle frame. The locknuts are then tightened to secure the connection.

Of course, in any of these various mounting positions, the planar configuration of the mounting brackets 34, 36 insures a narrow transverse profile and the necessary clearance to fit into tight areas such as between vehicle exhaust, suspension and frame components. Further, since each of the mounting brackets 34, 36 is a unitary or single-piece component connected directly between the main frame member 11 and the vehicle frame rigid connection is insured.

In accordance with an additional aspect of the present invention, it should be appreciated that the receiver box 20 is mounted underneath the cross member 12. In prior art hitch receiver designs incorporating a cross member with a circular cross section the receiver box is mounted through the cross member. Numerous benefits result from the underneath mounting of the receiver box in accordance with the present invention.

Since the receiver box 20 projects below the cross member 12, the cross member may be mounted further up from the ground behind the body work of the towing vehicle. There it is less visible and this is more aesthetically pleasing. Additionally, the mounting brackets 34, 36 may be made with a lower height profile from less material. They are therefore cheaper to make and weigh less. As a result, the trailer hitch receiver 10 is relatively light weight and easier to manipulate during installation. Further, since the cross member 12 may be mounted closer to the vehicle frame, the centroid axis of the cross member is closer to the mounting points. As a result, the moment arm is shortened thereby reducing the stress and bending force applied to the brackets during towing.

The secure mounting of the receiver box 20 to the cross member 12 is primarily achieved through the mounting gusset 24. The mounting gusset 24 is formed to bring a contoured upper edge 50 into substantially continuous load bearing engagement with the cross member 12 and a contoured lower edge 52 into substantially continuous load bearing engagement with the upper and side walls of the receiver box 20. Weld points along the intersection of these edges 50, 52 with the cross member 12 and receiver box 20 complete a high integrity connection.

Figure 6:
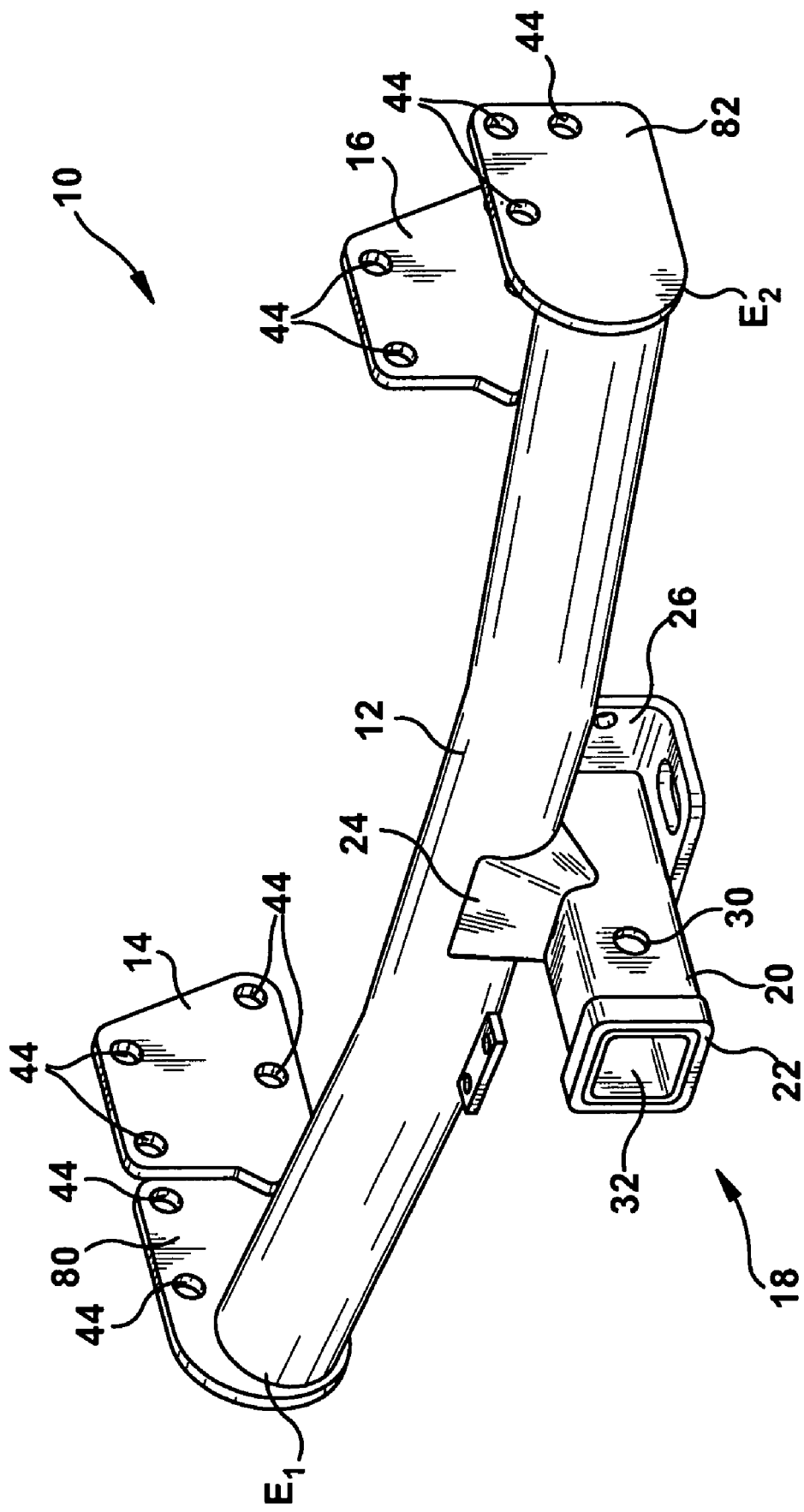
FIG. 6 is a detailed perspective view showing the mounting of the receiver box to the underside of the cross member through the mounting gusset.

FIG. 6 illustrates an alternative embodiment of the present invention. The receiver 10 of FIG. 6 includes a cross member 12, a first mounting flange 14, a second mounting flange 16, a hitch receiver box assembly 18, and first and second mounting brackets 34, 36 just like the previous embodiments. In addition, the receiver 10 includes a third mounting flange 80 mounted to the cross member 12 at the first end $E_1$ and a fourth mounting flange 82 mounted to the cross member at the second end $E_2$.

In the illustrated embodiment, the first and second mounting flanges 14, 16 are aligned in a first plane while the third and fourth mounting flanges 80, 82 are aligned in a second, different plane. As shown, the first plane is above the second plane. In certain applications such an arrangement may be desired to provide the necessary clearance between the third and fourth flanges 80, 82 and various vehicle components in order to allow the receiver 10 to be mounted to the vehicle by means of the mounting brackets 34, 36 carried on the first and second flanges 14, 16.

For other applications, it may be desirable to have all four flanges 14, 16, 80, 82 in the same plane. For still others, it may be desirable to have the third and fourth mounting flanges 80, 82 in a plane above the first and second mounting flanges 14, 16. Still further, it should be appreciated that the mounting brackets 34, 36 may be mounted to the third and fourth flanges 80, 82 instead of the first and second flanges 14, 16 in order to allow proper mounting of the receiver assembly 10 to the frame of certain vehicles. Advantageously, the different spacing between the first and second flanges 14, 16 and the third and fourth flanges 80, 82 allow one receiver assembly 10 to fit may more makes and models of vehicles. Accordingly, one may maintain a smaller parts inventory and still meet all customer needs.

Figure 7:
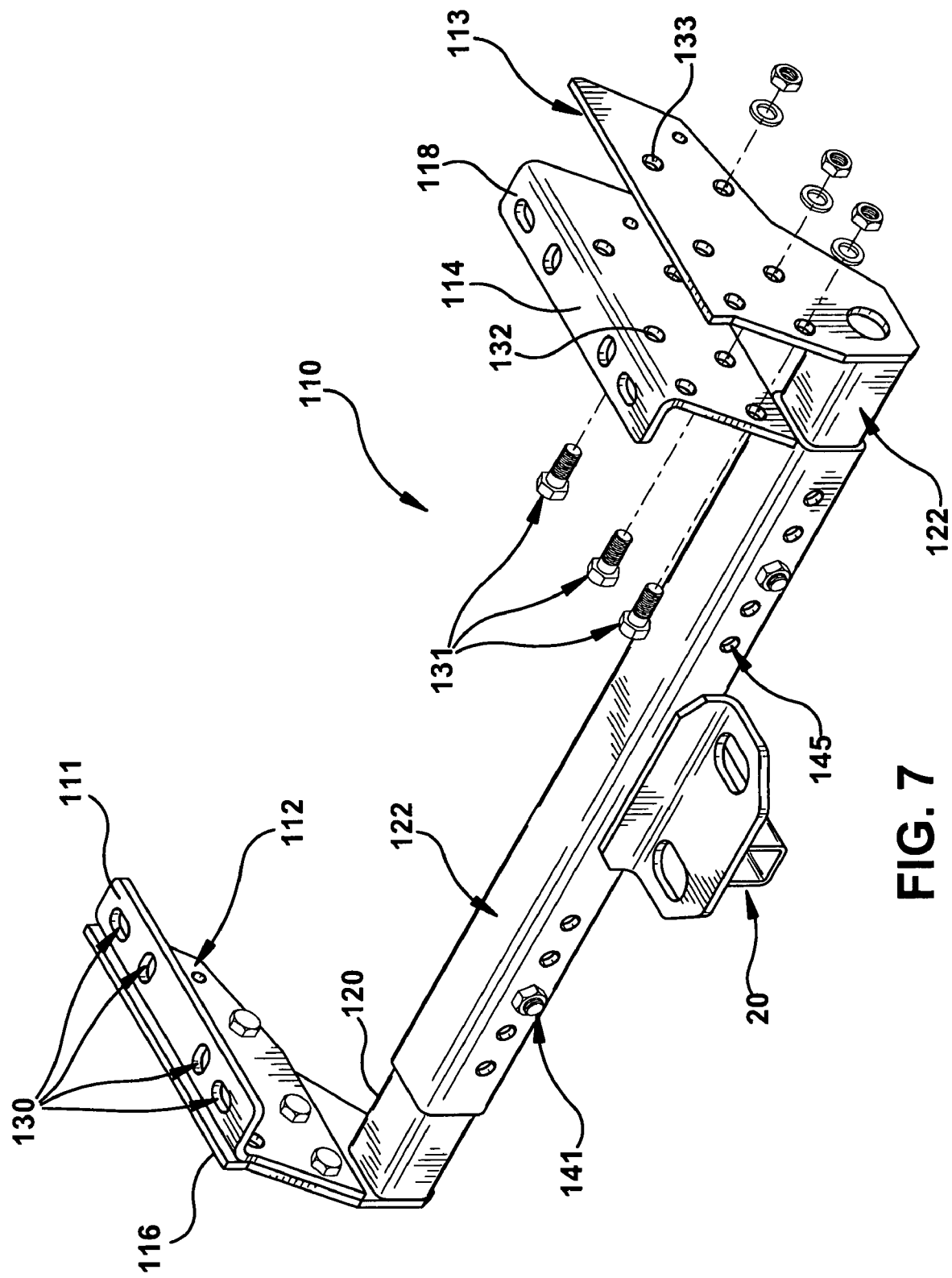
FIG. 7 is a perspective view showing an alternative embodiment of the hitch assembly of the present invention.

FIG. 7 illustrates an additional alternative embodiment of the present invention. The alternative embodiment of the receiver assembly 110 comprises first and second mounting brackets 112, 114 removably attachable to first and second mounting flanges 116, 118. The first and second mounting flanges 116, 118 are attached, either removably or non-removably, to first and second extension tubes 120, 121 respectively. A cross member 122 is telescopically received within the extension tubes 120, 122 at either end thereof. Finally, a receiver box 20 is attached to the cross member 122 as discussed above.

The first and second mounting brackets 112, 114 are capable of removable attachment to the vehicle frame via mounting skirts 111, 113 and to first and second mounting flanges 116, 118. The first and second mounting brackets 112, 114 are attached to the vehicle's frame via fasteners (not shown) passing through apertures 130 in said first and second mounting brackets 112, 114, or more particularly, in the skirts 111, 113 thereof. This is similar to the method of attaching the first and second mounting brackets of the alternative embodiments above. The first and second mounting brackets 112, 114 are removably attached to the first and second mounting flanges 116, 118 by fasteners 131 attaching to a set of mounting apertures 132 and a set of anchoring apertures 133 in the first and second mounting brackets 112, 114 and the first and second mounting flanges 116, 118, respectively. As shown in FIG. 7, the fasteners 131 are bolts, washers, and nuts. It should be understood, however, that other such fasteners may be used, not just those shown in FIG. 7.

Figure 8:
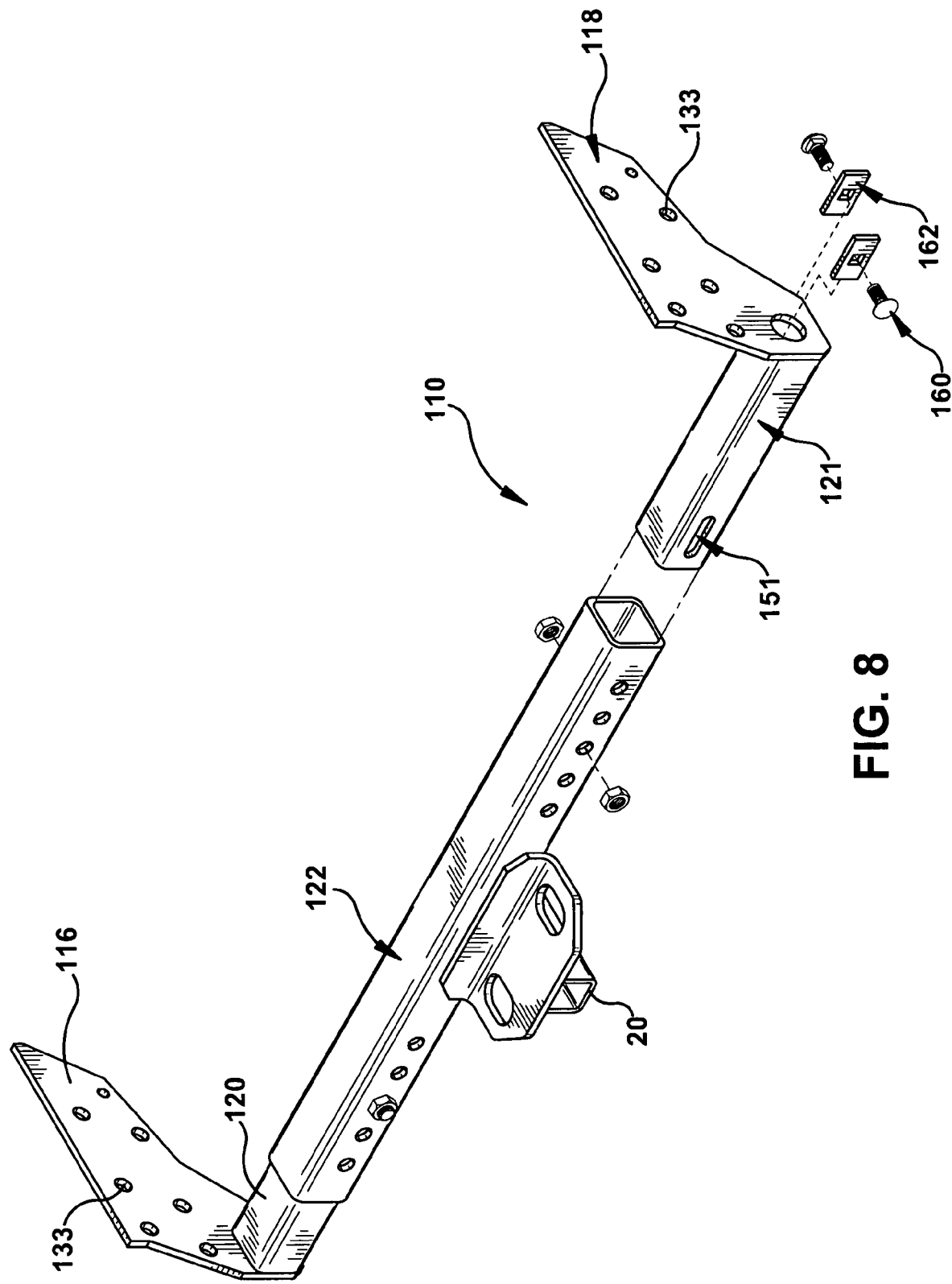
FIG. 8 is a perspective view of the alternative embodiment of the hitch assembly of the present invention with the mounting brackets.

The cross member 122 is located between the first and second mounting flanges 116, 118. The cross member 122 telescopically engages both the first and second extension tubes 120, 121 and is attached thereto by fasteners 141. The fasteners 141 can be nuts and bolts shown in FIG. 7, or alternatively, can be any other sort of fastener. The fasteners 141 pass through a set apertures 145 in both sides of the cross member 122. The apertures 145 are on both sides of the cross member 122 such that the fastener 141 can extend therethrough. Alternatively, the apertures 145 may receive the fastener 141 without the necessity of passing therethrough. In another alternative embodiment, the apertures 145 may only be on one side of the cross member 122. As shown in FIG. 8, the fasteners 145 may also pass through an oblong aperture 151 in the first and second extension tubes 120, 121.

By utilizing the present invention of the first and second mounting brackets 112, 114 and the first and second mounting flanges 116, 118 instead of a one-piece design, the user is able to take advantage of numerous possible configurations for the receiver assembly 110. For example, the first and second mounting brackets 112, 114 can be attached to the first and second mounting flanges 116, 118 in a raised vertical position (up) or a lowered vertical (down) position. In addition to, or alternatively, the first and second mounting brackets 112, 114 can be attached to the first and second mounting flanges 116, 118 fore or aft. The position of the apertures 133 located on the first and second mounting flanges 116, 118 and the position of the set of mounting apertures 132 on the first and second mounting brackets 112, 114 allow the receiver assembly 110 to be attached to the vehicle in several different positions, including, without limitation vertical and horizontal positions. The set of mounting apertures 132 and anchoring apertures 133 are in a predetermined pattern such that several different configurations of the receiver assembly 110 are possible. While two vertical configurations and two horizontal configurations are shown in the drawings, any number of such configurations can be accomplished.

Additionally, the first and second mounting brackets 112, 114 may also be mounted on the interior or exterior of the first and second mounting flanges 116, 118. Further, the first and second mounting brackets 112, 114 can be connected to the first and second mounting flanges 116, 118 with the apertures 130 of the first and second mounting brackets 112, 114 facing either inwardly or outwardly. In other words, the skirts 111, 113 of the first and second mounting brackets 112, 114 are reversible.

This embodiment, shown in FIG. 8 of the receiver assembly 110 provides increased mounting adjustability between the cross member 122 and the first and second extension tubes 120, 121. This is accomplished by utilizing fasteners 160 that connect to a bolt plate 162 that rests on the interior of the first and second extension tubes 120, 121. Where conventional hitch assemblies have bolts and nuts that apply force on the outer portion of the transverse tube, the present fastener 160 applies force directly between the interior of the first and second extension tubes 120, 121 via the oblong aperture 151 (only one of which is shown in FIG. 8) and the exterior of the first and second cross members 120, 121. This force permits greater connection strength and greater provision in allowing the cross member 122 to slide back-and-forth between the first and second mounting flanges 114, 116 prior to tightening.

In summary, numerous benefits result from employing the concepts of the present invention. Advantageously, the design of the receiver 10 and 110 of the present invention allows the selective positioning of the mounting brackets 34, 36, 112, 114 on the cross member 12, 122 either inboard or outboard of the mounting flanges 14, 16, 116, 118. Additionally, fore and aft adjustment is possible by aligning the first set of mounting apertures 40 or the second set of mounting apertures 42 in the mounting brackets 34, 36 with the anchoring apertures 44 in the mounting flanges 14, 16. Additionally, vertical and fore and aft adjustment is possible by aligning the first set of mounting apertures 132 in the first and second mounting brackets 112, 114 with the apertures 133 in the first and second mounting flanges 114, 116. Finally, the receiver assembly 110 is further adjustable using the telescoping first and second extension tubes 120, 121 with the cross member 122. Accordingly, adjustment in several positions is possible. For example, adjustment is possible in as many as two directions, fore and aft, in four directions, fore, aft up, and down, or even in five directions, fore, aft, up, down, and an additional horizontal adjustment. In this way, significant mounting versatility is provided so that the receiver 10 of the present invention may be used for multiple applications; that is, on various makes, models and option and accessory equipped towing vehicles.

The foregoing description of preferred embodiments of the invention has been presented for purposes of illustration and description. It is not intended to be exhaustive or to limit the invention to the precise form disclosed. Obvious modifications or variations are possible in light of the above teachings. For example, while the drawing figures illustrate a receiver 10 and 110 with the receiver box 20 mounted underneath the cross member 12 and 122, it should be appreciated that the receiver box 20 could either extend through or overlie the cross member. Further, the receiver 10 and 110 could be equipped with multiple accessory receivers mounted along the cross member at points other than the midpoint P; either in the presence or absence of the receiver box 20. Such accessory receivers could be spaced, for example, so as to receive the various vehicle accessories now being manufactured and marked by Cequent Towing Products, Inc. under the Dual Port Systems or DPS trademarks.

The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled. The drawings and preferred embodiment to not and are not intended to limit the ordinary meaning of the claims and their broad interpretation in any way.

Having thus described the invention, I claim:

1. A receiver for mounting to a frame of a motor vehicle, comprising:
    a main frame member including a cross member, a first end, a second end and a midpoint;
    a first selectively positionable mounting flange having a length and a height perpendicular to its length and capable of telescopically extending from said first end, said first mounting flange having a first series of anchoring apertures;
    a second selectively positionable mounting flange having a length and a height perpendicular to its length and capable of telescopically extending from said second end, said second mounting flange having a second series of anchoring apertures; and
    a pair of mounting brackets, each of said pair of mounting brackets includes a mounting skirt for engaging the frame of the motor vehicle, a first set of mounting apertures, and a second set of mounting apertures a spaced distance from said first set of mounting apertures, whereby said first set of mounting apertures are aligned with either of said first and second anchoring apertures to allow said mounting brackets to be secured to said main frame member in a first position and said second set of mounting apertures are aligned with either of said first and second anchoring apertures to allow said mounting brackets to be secured to said main frame member in a second position wherein, said mounting apertures and said anchoring apertures are arranged to provide adjustability of said pair of mounting brackets along said height and said length of said first and second mounting flanges.

2. The receiver of claim 1, wherein each of said pair of mounting brackets includes two planar surfaces extending substantially perpendicular to one another.

3. The receiver of claim 1, wherein each of said pair of mounting brackets includes a portion having an L-shaped cross section including a first planar surface and a second planar surface substantially perpendicular to one another.

4. The receiver of claim 1, wherein said pair of opposed mounting brackets are mounted outboard of said mounting flanges.

5. The receiver of claim 1, wherein said pair of opposed mounting brackets are mounted inboard of said mounting flanges.

6. The receiver of claim 1, further including fasteners for securing said pair of mounting brackets to said mounting flanges by extending said fasteners through said series of anchoring apertures and either of said first set of mounting apertures or said second set of mounting apertures.

7. The receiver of claim 1, wherein said mounting brackets are reversible so that said mounting skirts extend inwardly, toward each other or outwardly, away from each other.

8. The receiver of claim 1 wherein said pair of mounting brackets are nontubular and are secured directly between said main frame member and the frame of the motor vehicle.

9. The receiver of claim 1, wherein said main frame member includes a round cross section.

10. The receiver of claim 1, further including an accessory receiver carried on said cross member.

11. The receiver of claim 10, wherein said accessory receiver is mounted to said cross member at said midpoint.

12. The receiver of claim 11, wherein said accessory receiver is a hitch receiver box.

13. A receiver for mounting to a frame of a motor vehicle, comprising:
    a main frame member including a cross member, a first end, and a second end;
    a first selectively positionable mounting flange having a length and a height perpendicular to its length and having a first tube extending therefrom that telescopically engages said first end so that said first mounting flange is telescopically extendable from said first end, said first mounting flange having a first series of anchoring apertures;
    a second selectively positionable mounting flange having a length and a height perpendicular to its length and having a second tube extending therefrom that telescopically engages said second end so that said second mounting flange telescopically extends from said second end, said second mounting flange having a second series of anchoring apertures; and
    a pair of mounting brackets, each of said pair of mounting brackets including a mounting skirt for engaging the frame of the motor vehicle, a first set of mounting apertures, and a second set of mounting apertures a spaced distance from said first set of mounting apertures, whereby said first set of mounting apertures are aligned with either of said first and second anchoring apertures to allow said mounting brackets to be secured to said main frame member in a first position and said second set of mounting apertures are aligned with either of said first and second anchoring apertures to allow said mounting brackets to be secured to said main frame member in a second position wherein, said mounting apertures and said anchoring apertures are arranged to provide adjustability of said pair of mounting brackets along said height and said length of said first and second mounting flanges.

14. The receiver of claim 13, wherein said second position is horizontally fore or aft of said first position, raised or lowered vertically of said first position, or a combination thereof.

15. The receiver of claim 14, wherein said cross member includes a third set of mounting apertures and a forth set of mounting apertures, said first tube includes an anchoring aperture, and said second tube includes at least one anchoring aperture, whereby said first set of mounting apertures are aligned with either of said first and second anchoring apertures to allow said mounting flanges to be selectively secured to said main frame member.

16. The receiver of claim 15, further including fasteners for securing said first and second mounting flanges to said cross member by extending said fasteners through said series of anchoring apertures and either of said first set of mounting apertures or said second set of mounting apertures.

17. The receiver of claim 16, wherein said fasteners connect to a bolt plate on the interior of the first and second extension tubes.

18. The receiver of claim 17, wherein said apertures in said tubes is oblong.

* * * * *